United States Patent [19]
Hopkins

[11] Patent Number: 5,266,195
[45] Date of Patent: Nov. 30, 1993

[54] SPIRAL WOUND SEPARATION DEVICE AND METHOD OF MAKING SAME

[75] Inventor: David H. Hopkins, Escondido, Calif.

[73] Assignee: Desalination Systems, Inc., Escondido, Calif.

[21] Appl. No.: 927,340

[22] Filed: Aug. 10, 1992

[51] Int. Cl.[5] ............................................. B01D 63/10
[52] U.S. Cl. ........................... 210/321.74; 210/321.83; 210/493.4; 264/45.1; 264/DIG. 48; 264/DIG. 62
[58] Field of Search ........... 210/321.6, 321.72, 321.74, 210/321.76, 321.85, 321.83, 497.1, 494.1; 264/41, 45.1, DIG. 62, DIG. 48

[56] References Cited

U.S. PATENT DOCUMENTS

| | | | |
|---|---|---|---|
| 4,548,714 | 10/1985 | Kirwan, Jr. et al. | 210/232 |
| 4,789,480 | 12/1988 | Brüchke | 210/640 |
| 4,834,881 | 5/1989 | Sawada et al. | 210/321.74 |
| 4,855,058 | 8/1989 | Holland et al. | 210/652 |
| 4,906,372 | 3/1990 | Hopkins | 210/321.74 |

*Primary Examiner*—Frank Sever
*Attorney, Agent, or Firm*—Fitch, Even, Tabin & Flannery

[57] ABSTRACT

A sandwich of a permeate fabric material within a folded sheet of semipermeable membrane is spirally wound together with a sheet of porous feed pathway material about a mandrel which, upon its removal, provides a central hollow region in the wound element. A single band of adhesive seals the outer end of the envelope, and once wrapping is completed, a thin layer of porous tape holds the winding tight. A porous small diameter tube is inserted into a pocket adjacent the fold in the semipermeable membrane material near the center of the winding and serves as a permeate discharge conduit. Axial ends of the spirally wound subassembly are sequentially potted in resin to complete the basic fabrication of the element. Communication with the feed pathway material is provided by drilling through the resin into the center hollow region. The spirally wound element can be used as a replacement cartridge for a device having a permanent housing, or it can be integrally bonded within a surrounding pressure vessel assembly to form a disposable water purification unit. Feedwater supplied to the open center region flows spirally outward, while permeating purified water flows spirally inward to the porous tube which serves as a pure water discharge conduit.

19 Claims, 2 Drawing Sheets

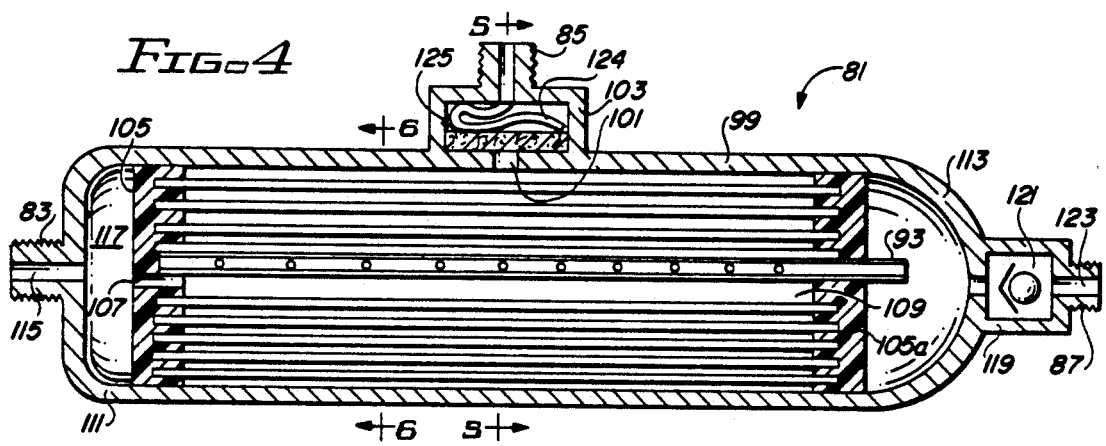
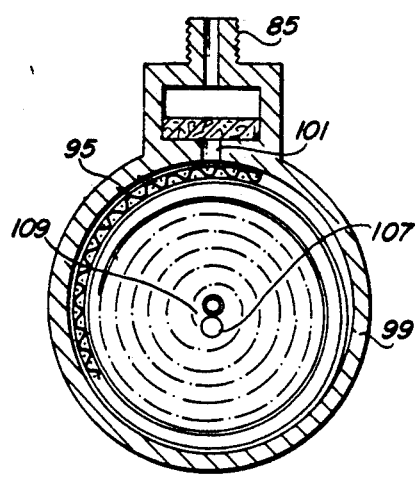
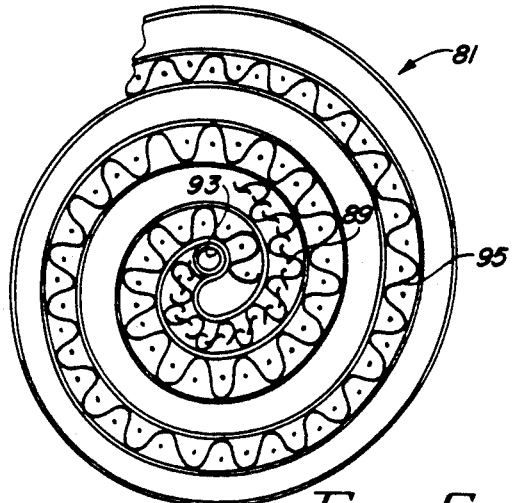
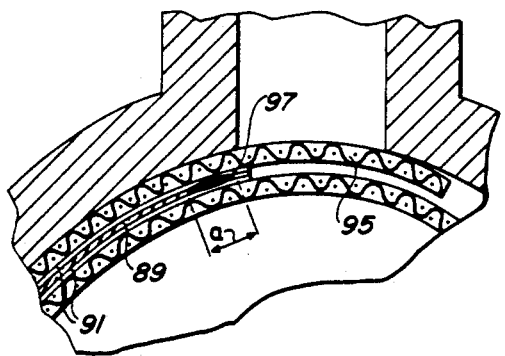
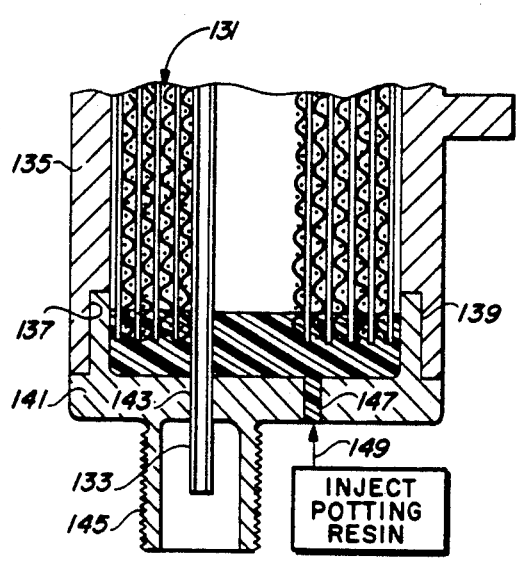

SPIRAL WOUND SEPARATION DEVICE AND METHOD OF MAKING SAME

FIELD OF INVENTION

The invention relates to spirally wound semipermeable membrane separation devices and more particularly to such devices designed for point-of-use applications to provide pure water and to methods of making such devices and/or subassemblies for use therein in a manner which permits substantially increased rate of production, many steps of which can be automated or at least made semiautomatic.

BACKGROUND OF THE INVENTION

Membrane separation devices, particularly those using modules or cartridges wherein a membrane arrangement is spirally wound about a central porous tube to create a module or cartridge, constitute a well developed state of art today, and such modules find use in many and varied separation devices and processes. U.S. Pat. Nos. 4,548,714 and 4,906,372 are examples of spiral wound membrane cartridges for use in surrounding pressure vessels to facilitate the separation of one component from a mixture of that component and others, or from a solution containing that component, to transform a feed stream into a first stream containing essentially the pure component and a concentrate or retentate stream. U.S. Pat. No. 4,834,881 is an example of another type of spiral wound membrane module wherein a spacer of generally corrugated or zigzag shape is employed between the spiral winding to provide the passageway for the feed stream.

U.S. Pat. No. 4,855,058 to Holland et al., entitled "High Recovery Spiral Wound Membrane Element", discloses a spirally wound membrane element of this general type wherein the feed enters a porous central tube and flows into an outwardly spiralling channel; the concentrate stream leaves at the outer edge of the spiral winding after passing through the full length of the spiral feed passageway. A spiral permeate channel is defined within a membrane sandwich that is closed at both its spiral outward end and its spiral inner end, with at least one lateral edge being left open so that the permeate leaves the spiral permeate passageway along the open lateral edge, i.e. at one axial end of the spirally wound element. As a result of this arrangement, the direction of flow of the permeate is at right angles to the spiral flow path traveled by the feed-concentrate stream. The opposite axial end of the spirally wound element from this exit end is sealed by potting in a low viscosity adhesive while attaching an end cup thereto. However, this element construction requires a high pressure seal outside of the membrane envelope, and careful manufacturing procedures must be followed, e.g., carefully applying a polymer film or metal foil to the knitted permeate fabric along whichever edge which will serve as the permeate exit to prevent adhesive penetration into the permeate fabric (Col. 7, lines 30-55). Preferably, such application should provide seals 6 to 10 inches long after the fabric has been rolled into a tight cylinder. It is normally also necessary to recess the membrane sheets and the feed spacer sheets so that they do not extend to the full width of the element. In essence, this arrangement differs from the standard spiral-wound element because the feed-brine spacer sheet is sealed along its lateral edges between 2 sheets of membrane, which is accomplished by spreading adhesive along the periphery of the two membrane sheets to create a sealed envelope before the rolling operation begins, a fairly complicated and costly manufacturing procedure. After potting, a portion of one axial end of the rolled element must be trimmed by sawing to open the permeate discharge channel.

A substantial portion of the cost of making relatively small, spirally wound membrane modules, for example those designed for point-of-use applications to provide pure water, lies in the cost of the manufacturing labor. However, material cost is also relatively high because a large percentage of square feet of material is lost or rendered inactive as a result of the standard manufacturing techniques used. Spiral wound element designs which can minimize labor costs are desirable, particularly those that are adaptable to automated or semi-automated manufacturing procedures. The traditional need to apply lines of adhesive along the edges of sheets as they are being rolled into a spiral element is an inherent limitation to the speed at which rolling can be effected, but it is preferred to pre-applying lines of adhesive along lateral edges of pre-cut sheets. Moreover, because regions saturated with adhesive become inactive from the standpoint of participating in the separation process, i.e., reverse osmosis (RO) or ultrafiltration (UF), the effective active surface area is reduced, lowering the overall operating capacity of the element. Improvements to overcome such shortcomings have been sought for a number of years.

SUMMARY OF THE INVENTION

The invention provides spirally wound membrane element designs which can achieve greater amounts of active membrane surface area per unit volume than what has been heretofore possible utilizing the traditional design and methods which constitute a substantial improvement in manufacturing operations and result in lower labor costs. Both objectives are achieved by the elimination of the need to apply lines of adhesive along the lateral edges of the compilation of sheets that are being rolled to form the spirally wound membrane element either prior to or during rolling. Because the traditional processes for spiral wound membrane element manufacture have required both the application of adhesive during the rolling process and the forcing of such adhesive into open areas in the fabric (causing it to spread over a fairly wide region), operations were limited by the viscosity of the adhesive, the porosity of the fabric and the width requirements of the line of adhesive. By not requiring any edge-gluing until the roll-up is complete, the rate at which rolling can now be accomplished with sheet materials that are essentially free of adhesive, is much higher, often 5 to 10 times higher than traditional rates. Moreover, the elimination of the application of individual adhesive bands along both lateral edges of the membrane envelope can very substantially increase membrane utilization efficiency, sometimes allowing the active surface area of membrane within a given unit volume to be increased by nearly 50%.

The invention accomplishes these objectives by providing a spirally wound semipermeable membrane element, which is particularly useful in a point-of-use water separation device, wherein a permeate exit tube extends into an otherwise sealed region within a spiral, semipermeable membrane envelope and provides a conduit for delivering pure water or the like to a location away from the immediate region of the element. In combination with this arrangement, the element is also designed so that the feed-side flow path through the spiral-wound element, instead of being the traditional axial path, i.e. from end to end through the element, instead spirals either inward or outward. This overall combined arrangement wherein there is no flow axially into or out of the lateral edges of the spirally wound layers of sheet material, results in a substantial manufacturing advantage by allowing the major application of adhesive to take place following the completion of the winding step.

This improved manufacturing method facilitates automated manufacturing of these elements, allowing fabrication to be effected by simply initially winding a lay-up of different sheets about a removable core or mandrel, with the adhesive potting steps being carried out following such winding and after removal of the core. The overall design arrangement permits the spiral wound semipermeable membrane element to be fashioned either as a replaceable module for use in a separate pressure vessel or as a self-contained unit, by appropriately potting a spirally wound element within a surrounding shell that serves as a pressure vessel. These units are considered to be particularly suitable for use as individual units connected to feed-side supply pressures of up to about 200 psi and are expected to have particular application when employed as point-of-use potable water installations.

BRIEF DESCRIPTION OF THE DRAWINGS

FIG. 4 is an alternative embodiment of a point-of-use water separation device which includes a spirally wound semipermeable membrane element generally similar to that shown in the device of FIG. 1 integrally attached within a pressure vessel;

FIG. 5 is a sectional view taken generally along the line 5—5 of FIG. 4;

FIG. 6 is an enlarged sectional view of the center section of the semipermeable membrane element shown in FIG. 5, taken generally along the line 6—6 of FIG. 4;

FIG. 7 is an enlarged fragmentary view of an outer portion of the device including the spirally wound semipermeable membrane element as shown in FIG. 5; and FIG. 8 is schematic view showing how one end of a spirally wound membrane subassembly might be integrally potted within a surrounding tubular open-ended body with a separately molded end cap fitted in place, to fabricate an alternative embodiment of a device to that shown in FIG. 4, embodying various features of the invention.

DETAILED DESCRIPTION OF THE PREFERRED EMBODIMENTS

Very generally, the invention provides elements or cartridges 11 formed from spirally wound reverse osmosis or ultrafiltration membranes, which cartridges are capable of particular economies of fabrication. The semipermeable membrane used in the elements is such so as to separate a feed mixture into separate components. Feed mixture is used to generally describe a fluid mixture of at least two components which can be a solution of a solid or of a liquid in another liquid, or a mixture of two liquids, or a mixture of two gases. In its travel through the spiral winding, one gas or one liquid, i.e. the "permeate", is separated from the remainder of the mixture, i.e. the retentate, which exits the spiral element in a form in which it is more concentrated than when it entered as the feed. If, for example, a cartridge is designed to produce potable water, substantially pure liquid water permeates through the semipermeable membrane, and a solution of more concentrated salt or brine discharges from the end of the feed-flow pathway.

Figure 3:
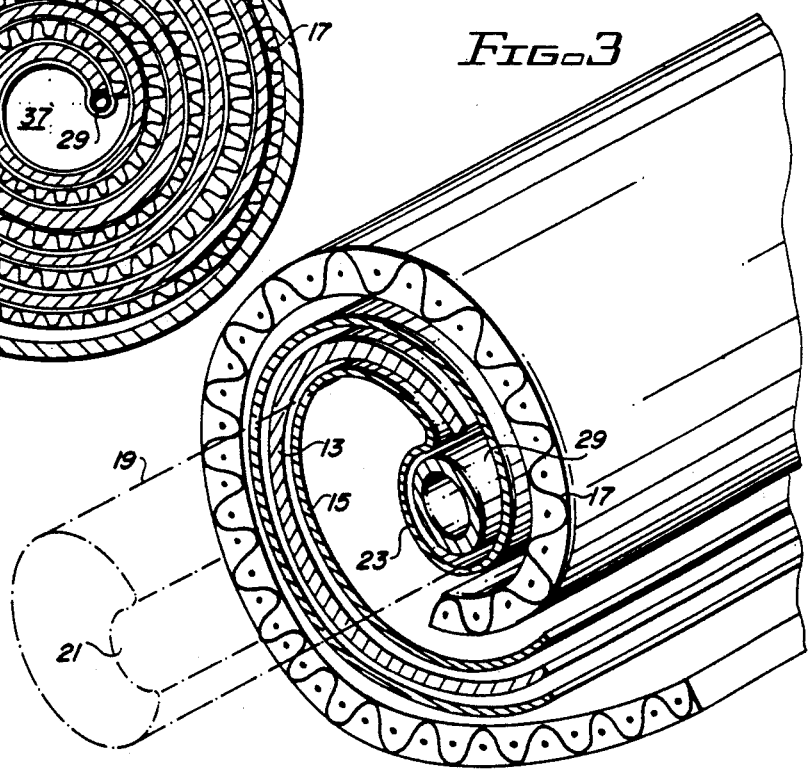
FIG. 3 is a schematic view showing the initial winding of the semipermeable membrane element of FIG. 1 with a removable core being shown in dotted outline.

As best seen perhaps in FIG. 3, the cartridge 11 is assembled by forming a sandwich of a sheet 13 of permeate carrier material within a folded-over sheet 15 of semipermeable membrane having about twice the length of the carrier material sheet that creates two facing panels. The sandwich is wound together with a sheet or layer 17 of feed flow pathway-providing material which is located along the radially outer surface of the membrane sandwich during the winding operation. The winding takes place about a removable mandrel 19 which can be circular in cross-section and have a groove 21 such as is depicted in FIG. 3 to accommodate a section of excess length of the folded-over membrane which extends beyond the end of the permeate passageway sheet 13 and creates an open pocket 23 that is described hereinafter; alternatively, it can have a radial slot into which the end section of the membrane sandwich including, if desired, the leading end of the feed pathway material will be received. The provision of such a slot or groove 21 can facilitate winding of the element about the removable mandrel 19.

Any suitable materials such as are well known in this art may be used for the sheet materials that are employed. The permeate passageway layers may be of porous fabric material or a felt as well known in this art, and fabric made of knitted polyester materials sold under the trade name "Tricot" is preferably used, as well known in this art. Coated fabrics, such as epoxy or melamine-coated polyester knitted or woven material, may also be used. The feed pathway materials are commonly made of an extruded polyethylene or polypropylene materials woven or netting materials, such as those sold under the trademark "Vexar". If desired, asymmetric semipermeable RO membranes or suitable UF membranes can be employed; however, the more recently developed composite, thin film RO membranes are becoming more widely used. In this latter type of RO membrane, a dense active layer is formed of a chemically different material than a nonactive supporting layer. Such composite membranes can be made by various suitable methods; however, an interfacial condensation reaction is generally carried out wherein two reactants form a thin film, often a polyamide, that constitutes a thin, dense polymeric surface layer having the desired semipermeable characteristics. This dense, active surface layer is located on the outer surface of the membrane envelope in the present arrangement, with the nonactive supporting layers lying interior thereof against the permeate passageway sheets 13. Very commonly, the immediate supporting layer on which the interfacial condensation reaction takes place is a suitable polymeric material, preferably a polysulfone, having the desired pore size to adequately support the ultrathin interfacial layer without creating undesirably high pressure drops across the supporting layer. Such a thin-film-membrane-supporting polysulfone layer is itself often cast upon a thin layer of polyester nonwoven felt backing material which essentially integrally supports the composite membrane against puncture and excessive deformations, as is well known in this art, and also contributes to the overall permeate passageway.

Previously the lateral edges of the sheets of semipermeable membrane facing the permeate passageway were respectively sealed to the edges of the permeate passageway layer that was being sandwiched therebetween by applying sufficient adhesive during the rolling process to saturate a few inches of each lateral edge of the permeate passageway layer, to spread throughout the edge of this layer, and to also seal tightly to the facing felt surfaces of the semipermeable membrane sheets, thereby effecting a complete seal along each lateral edge of spirally wound assembly in this specific permeate region. At the same time, it was important not to apply excess amounts of adhesive that might flow into and clog the adjacent edges of the feed pathway material, or to oversaturate the edges such that the adhesive would spread further inward and effectively removes more surface area of the semipermeable membrane from active separation operation. Because the present concept eliminates the requirement for such edge-gluing during the roll-up step, the rate of rolling is limited only by the rolling equipment, and the rate can thus be significantly greater than the traditional rate achieved when bands of adhesive were applied along each lateral edge. For example, whereas traditional methods typically resulted in the rolling of three to four lineal feet of membrane per minute, speeds of up to about ten times this rate can be obtained once the gluing (i.e. adhesive-applying) step has been eliminated. Moreover, whereas it was standard practice to individually roll each element regardless of whether it was 10, 20, 30, 40 or 48 inches in length, thereby only fabricating a single element at one time, it is now possible to roll an array of sheet material having a width sufficient, for example, to constitute 3 or 4 spirally wound elements. After such a roll-up is completed, the extra long assembly is slit into 3 or 4 separate sections of equal length which are then used to form multiple individual cartridges or elements.

When the rolling operation is nearly complete, a single line or band of adhesive 25 is applied to the permeate passageway layer 13 to create an end seal across the radially outward or trailing end of the permeate layer, sealing the layer 13 to the facing felt surfaces of the pair of semipermeable membrane sheets 15 that sandwich it between them. A strip 25 of adhesive about ¾ inch wide (see FIG. 2) might be employed at a location about 1 inch from the end so that the adhesive does not spread out significantly past the end and possibly interfere with flow through the feed pathway layer. At this time, a short piece of porous tape 27 having adhesive on one surface, which is made of very thin, nonwoven dacron felt or the like, is attached to the radially outermost end edge of the feed pathway material. The piece of porous tape should have one dimension about equal to the axial length of the element assembly being wound, and its other dimension should be about 150% of the circumference of the element assembly, i.e. sufficient to essentially wrap just more than once around the outer circumference of the spirally wound assembly and secure the element 11 in the tightly wound condition. Because of its thinness and porosity, the outer layer of porous tape does not interfere with fluid flow to or from the feed pathway layer. The porous tape 27 is shown in FIG. 2 as a thin layer surrounding the entire circumference.

Once the rolling is complete and the porous tape 27 has been applied, the assembly can be split into 2, 3 or 4 or any desired number of sections depending upon the length of the individual elements 11 that are desired. At the same time, the two outermost edges are preferably also trimmed to remove usually less than an inch of material on each edge and present a clean edge surface. Preferably, the central mandrel 19 about which the assembly was rolled is removed before the slitting and trimming is completed. Following slitting, each of the separate spirally wound assemblies is handled individually to complete the fabrication of the elements 11.

Figure 1:
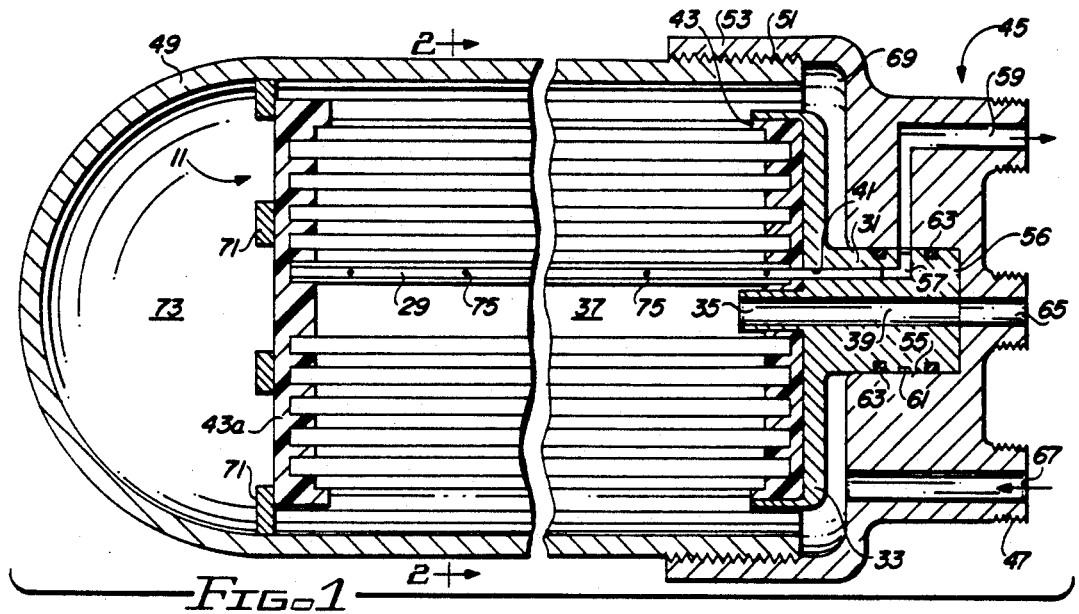
FIG. 1 is a sectional view showing a point-of-use water separation device including a removable spirally wound semipermeable membrane element which embodies various features of the present invention.
Figure 2:
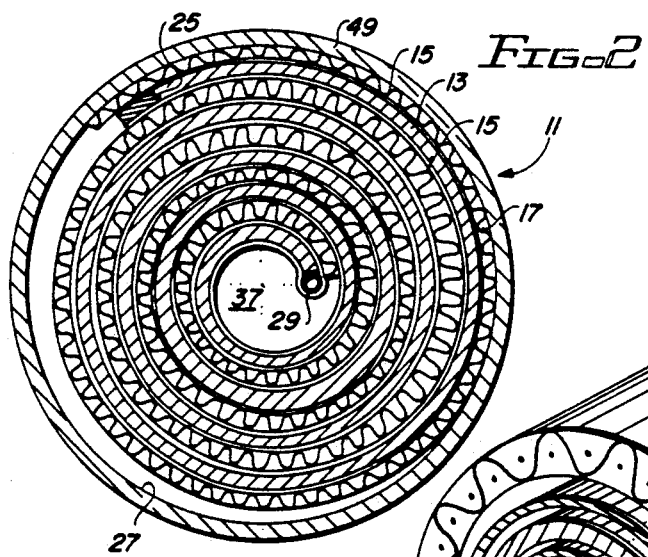
FIG. 2 is a sectional view, taken through the element alone, generally along the line 2—2 of FIG. 1.

First, a porous small tube or straw 29 is inserted through a location near the center of the spirally wound assembly, more specifically into the open pocket 23 provided at the fold of the semipermeable membrane sheet material 15, which extends past the end of the permeate layer 13 to form the receiving pocket as seen in FIGS. 2 and 3. The straw 29 is inserted so that it terminates at the left-hand edge of the assembly, as shown in FIG. 1, but extends a substantial axial distance past the right-hand edge where it serves as a permeate outlet from the element.

As can be best seen in FIG. 1, the end of the spirally wound assembly from which the straw 29 protrudes is joined to an adapter or connector 31. The adapter 31 has an open cup-shaped section 33 that surrounds a short, centrally located hollow boss 35 which extends upward from the base of the cup and which is of such a size as to be received within the open center region 37 of the spirally wound assembly previously occupied by the removable mandrel 19. A central passageway 39 extends completely through the adapter and is in alignment with the base of the hollow boss 35. The adapter 31 also contains a smaller diameter passageway 41 having an entry section which is parallel to the center axial passageway 39 and which is of a size just large enough to receive the protruding end of the straw 29.

For production purposes, a suitable jig is provided to support the assembly with its axis aligned vertically and with its lower edge located within the space encompassed by the upwardly extending sidewall of the adapter cup portion 33 and with the straw 29 snugly received in the passageway 41. A measured amount of a relatively low viscosity, polymeric potting material 43, such as a thermosetting resin, e.g. an epoxy or polyurethane resin composition, is then caused to flow into the cup and allowed to slowly spread throughout. The potting material 43 flows upward in the relatively open Vexar feed pathway layers, and it works its way upward in the Tricot fabric that serves as the permeate layer and also into the nonwoven felt which serves as the substrate for the semipermeable membrane support. When the resin hardens, it totally seals the entire axial end of the spirally wound assembly except for the passageway provided by the straw 29 and the open central axial passageway 39 that extends through the center of the hollow boss 35. This sealing is extremely cost-efficient because it only extends into the spiral windings for a fraction of an inch, e.g. about one-sixteenth to one-quarter inch for an element assembly about 2 in. in diameter, to provide a total seal; thus, it does not eliminate a large amount of operational membrane surface area.

After the potting material has hardened so that the adapter 31 has become an integral part of one axial end of the eventual spirally wound element, a similar potting operation is carried out at the other axial end by locating it spaced about the same distance from the surface of a cup-shaped mold having a release coating on the mold surface. Again, a measured amount of potting material 43a is added to the mold, and it is allowed to spread throughout, again permeating into the edges of the porous feed pathway material, the permeate passageway layer and the nonwoven substrate of the semipermeable membrane and to fill the end of the straw 29 to serve as a plug at that location. Thus, when the potting material 43a has hardened, the other axial end is completely sealed against any liquid flow, completing the fabrication of the spirally wound element 11 which is then removed from the mold.

The element 11, by virtue of its particular adapter 31, is designed to be used as a replaceable cartridge reverse osmosis purification device that produces potable water. Although such an overall water purification device can have a variety of shapes, shown in FIG. 1 is a device 45 which is relatively simple to manufacture and effective in its use. The device 45 includes a 2-piece pressure vessel having a base 47 and an elongated housing 49 of generally tubular shape with one integrally formed, rounded or hemispherical end. The open end of the housing 49 carries a set of external threads 51 which mate with internal or female threads formed on a short cylindrical flange 53 extending from one end of the base 47. For example, the housing 49 may have an internal diameter of about 2 inches and a length of about 12 to about 18 inches when designed for normal residential use. The base 47 has a central cylindrical cavity 55 which receives the cylindrical stem or head end 56 of the adapter 31. A right-angle passageway section 57 extends radially outward from the end of the passageway 41, which accommodates the straw 29, and is located to communicate with a connecting discharge passageway 59 in the base. So as to be certain that there is communication between the adapter passageway section 57 and the base passageway 59, a shallow groove 61 is provided in the surface of the adapter stem 56 which groove extends for 360° about this surface region so that permeate flow from the adapter can reach the main discharge passageway 59 of the base regardless of the angular orientation of the element. The shallow groove 61 on the stem portion 56 of the adapter is flanked by a pair of additional grooves which hold O-rings 63 and thus effectively seal the permeate passageway from communication either with the feed stream or with the concentrate stream.

In addition to the discharge passageway 59, the base portion 47 of the pressure vessel contains two other passageways that communicate directly therethrough. A short central passageway 65 is aligned with the central passageway 39 through the adapter 31, and in the illustrated device 45, it is designed to serve as an outlet for the concentrate. A side inlet passageway 67, which can be connected through a suitable filter to a municipal water supply line or the like, extends from the exterior of the base to an interior surface thereof which is spaced slightly from the facing surface of the adapter to create a plenum 69 into which the feedwater flows. The feedwater fills the annular space between the exterior surface of the element 11 and the interior wall of the housing 49; it also flows between a series of spaced-apart ledges 71 (which are molded in the interior surface of the housing to clamp the stem 56 in operative position) and fills a left-hand hollow region 73, which could be eliminated if desired. As can be seen from FIG. 2, the feed pathway spacer material 17 constitutes the entire outer surface of the element, and thus the feedwater fills this region and flows spirally inward along the exterior surfaces of the membrane sheet material 15 which make up the sandwich until reaching the center cavity. Because of the potted end seals, the feedwater is restricted to this spiral path, and as it flows along the path at a pressure above the osmotic pressure, pure water permeates through the semipermeable membrane and enters the permeate passageway layer 13 while the spirally flowing feedwater becomes gradually more concentrated. The concentrated liquid or brine which reaches the center cavity 37 in the element flows out through the central exit passageway 39 through the adapter and the aligned passageway 65 in the base 47 which serves as the concentrate exit. The base 47 is preferably molded so that the fittings which encompass the outer ends of the three passageways 59, 65 and 67 have male pipe threads which facilitate the connection thereto of appropriate conduits.

The permeating pure water which enters the spiral permeate layer along its entire length in the sandwich, after passing through the pores in the semipermeable membranes, also flows spirally inward (parallel to the flow of the feedwater being concentrated) until it reaches the inward end of the membrane sandwich. Here, the permeate enters the porous straw 29 through a plurality of holes 75 provided in the sidewall of the straw. Inasmuch as the left-hand end of the straw is sealed by the potting material 43a, the entire discharge flow is out the right-hand end to the passageway 41 in the adapter, through the connecting passageway 57 and the shallow groove 61, and then out of the pressure vessel at the side outlet passageway 59. Thus, the invention provides a particularly efficient design for making a very economical, point-of-use, spirally wound cartridge 11 for providing a supply of potable water having several economies over traditional designs.

Shown in FIGS. 4 through 7 is an alternative embodiment of a spirally wound element that is incorporated in an integral pressure vessel which facilitates replacement as a disposable overall unit 81. The design of the point-of-use water separation device or unit 81 is such that three pipe-fitting connections 83, 85 and 87, extending in three different directions are carried by the pressure vessel; they are preferably provided by molding nipples with male pipe threads as integral portions of the 3 pressure vessel components, which threads provide ready connections to the inlets and outlets. This design facilitates homeowner replacement because, instead of having to unscrew a housing from a base, while the housing is full of water, the 3 pipe connections to the inlet and outlet fittings 83, 85, 87 can be simply decoupled and a replacement pressure vessel unit 81 swapped for one which has served is useful lifetime.

More specifically, the unit 81 utilizes a spirally wound semipermeable membrane assembly that is manufactured in a manner substantially similarly to that described with respect to the element 11. It utilizes a sandwich of polyester fabric 89 or the like between a folded-over sheet of semipermeable membrane material 91 with the fabric terminating short of the folded-over inner end to leave room for a pocket into which a thin, porous tube or straw 93 is inserted to serve as the permeate discharge conduit. Again, the element is wound around a removable mandrel, and when the winding of the pre-cut lengths of folded-over membrane 91, sandwiched permeate passageway fabric 89 and Vexar feed pathway material 95 is essentially completed, a band or line of adhesive 97 having a width "a" (FIG. 7) is applied across the permeate fabric. The distance a is about ½ inch, and the band is preferably located about 1 inch from the outer longitudinal end of the fabric sheet. Sufficient adhesive is applied so that it saturates the fabric and creates a strong bond to the facing felt surfaces of the semipermeable membrane sandwich material sealing the radially outer end of the spirally wound sandwich. At the same time, a length of very thin porous tape is applied to the exterior surface of the feed pathway material and wrapped entirely around the assembly as previously described to maintain the tightly wound configuration. After trimming and cutting the assembly to size, the mandrel is removed, and the small diameter porous tube or straw 93 is inserted in the pocket at the inner end of the folded-over semipermeable membrane.

The spirally wound subassembly is then installed in an open-ended tubular housing 99 which is formed with a side passageway 101 leading to a side chamber 103 which carries the fitting 85. First the left-hand end as illustrated in FIG. 4 is potted. The end of the housing 91 is disposed in a mold fixture having a fitting through which a metered quantity of potting resin 105, such as epoxy or polyurethane, can be injected upward so it fills the bottom of the tubular housing 99 and enters the end edges of the porous Vexar feed pathway material 95, the permeate passageway layer 89 and the nonwoven felt substrate of the semipermeable membrane for an axial distance of a fraction of an inch.

After the potting resin 105 hardens, the other end of the open-ended housing 99, carrying the membrane subassembly, is oriented vertically and seated in a generally similar fixture which is designated to accommodate the end of the porous straw 93 that extends from the right-hand end of the element. Again, a sufficient metered amount of potting resin 105a is injected into the mold cavity formed by the mating of the fixture to the end of the tubular pressure vessel.

When the potting of both ends has been completed, a hole 107 is drilled in the left-hand end through the potting resin 105 into the center region 109 to provide communication to the interior of the assembly and to the radially inner end of the spiral feed pathway. Axial end sections 111 and 113 are then permanently affixed to the ends of the generally right circular cylindrical pressure vessel by spin-welding, adhesive bonding or the like so as to complete the permanent encapsulation of the spirally wound element within the pressure vessel. The left-hand end section 111 carries the fitting 83 having a standard pipe thread through which a passageway 115 extends to a hollow chamber 117. In actuality, the large chamber 117 is nonessential as it is only necessary that communication be provided between the passageway 115 through the fitting and the drilled passageway 107 in the potting material. Thus, if desired, an entire end unit could be molded onto the end of the tube, after the potting resin has hardened, that would include the threaded fitting, and a single hole could be drilled through such a fitting directly into the center region that would provide communication into the central region 109 of the spirally wound element at one end.

The right-hand end unit 113 serves as a permeate collection chamber wherein pure water collects and then flows through a small exit chamber 119, wherein a check valve 121 is provided; it exits through a discharge passageway 123 in the fitting 87 which carries a male pipe thread. The side chamber 103 is designed to serve as the feed exit chamber although, as indicated hereinafter, it could be used for the feed entrance. It contains a capillary-type flow restrictor 124 or some alternative form of flow regulator which controls the flow and assures the desired amount of back pressure is maintained on the feed side of the membrane. It also contains a safety filter 125 which serves to prevent possible clogging, particularly by extraneous small particles introduced during manufacturing, of the capillary type flow restrictor, which may be a short length of tubing of polyethylene or the like about 0.020 inch in diameter.

In operation, the self-contained purification unit 81 can be connected to the standard domestic water inlet line at the fitting 83 on the left-hand end unit. The fitting 85 on the side chamber 103 would then be connected to a conduit leading to waste. A pure water outlet line is connected to the fitting 87 on the right-hand end, adjacent the check valve 121. Water under normal supply pressure enters the center region 109, through the drilled hole 107, and flows into the feed pathway material 95. Because both axial ends of the unit are sealed with the potting resin, the only flowpath is spirally outward. As the feedwater slowly traverses this spiral path, pure water is continuously permeating through the surface area of the semipermeable membrane envelope spiral winding, which defines both surfaces for this spiral feed path. This pure water enters the permeate passageway fabric in which it flows spirally inward until it reaches the porous straw 93 near the center because both lateral edges of the elongated sandwich are sealed by the potting resin. The pure water fills the hollow chamber in the right-hand end section 113 and then flows through the check valve 121 and out the pure water discharge passageway 123. The concentrated water or brine reaches the outermost layer of feed material 95 which surrounds the spirally wound membrane sandwich (see FIG. 7) and exits therefrom via the passageway 101, through the side chamber 103 and out the fitting 85, flowing from there either to drain or to some recycling arrangement.

Although the invention has been described with regard to certain preferred embodiments, it should be understood that various changes and modifications as would be obvious to one having the ordinary skill in this art can be made without departing from the scope of the invention which is defined solely by the claims appended hereto. For example, although two illustrative embodiments of devices utilizing the novel, spirally wound semipermeable membrane element have been shown, other designs can also benefit from this improved unit. For example, the pressure vessel unit 81 could be used with the feed pathway flow reversed so that the feedwater enters the side chamber 103 and flows spirally inward through the feed flow pathway, exiting via the left-hand fitting 83. If the fitting 85 is used as the entrance, the flow restrictor 124 would be omitted, and the filter 125 could also be omitted. The inlet and outlet connections on the feed-side of the separation device 45 could also be reversed so that feedwater flow is in the opposite spiral direction.

Shown in FIG. 8 is an example of a modification that might be made in the integral pressure vessel unit 81 shown in FIGS. 4-7. The spiral winding of the plurality of sheets and the insertion of a straw takes place as previously described so as to create a subassembly 131 from one end of which a straw 133 protrudes. The subassembly is then inserted into an open-ended tubular housing 135 which serves as the main body of the pressure vessel and which has an annular recess 137 formed in its interior surface at each axial end. Each recess receives an upstanding annular flange 139 that is formed as a part of an end cap 141 and provides a cup for receiving potting resin as previously described. The end cap 141 includes a passageway 143 through which the straw 133 passes and an integral, pipe-threaded fitting 145, the hollow internal portion of which receives the end of the straw 133 when the subassembly is mated with the end cap 141. As depicted in FIG. 8, a fluid-tight seal is created, adhesively or otherwise, between the recessed end of the tubular body 135 and the exterior surface of the cylindrical flange 139 portion of the end cap. A second passageway 147 is provided in the end wall of the end cap 141, which is used as a supply conduit to connect the assembly to a device 149 for injecting a metered amount of potting resin thereinto. The amount of resin is sufficient to completely seal the axial end of the spirally wound assembly, flowing slightly upward into the interstices of the feed pathway region and the permeate passageway region between both surfaces of the sheets of semipermeable membrane which create the sandwich. The hardened polymeric resin also seals the passageway 147 through which injection took place. Thus, in the arrangement shown in FIG. 8, the permeating water discharges directly from the straw 133 into the interior of the fitting 145 which leads to a pure water reservoir or other point-of-use. A similar type of end cap is installed on the other end except that the pipe-threaded fitting portion would be centered axially so that, after hardening of the resin, an axial hole could be drilled through the center of the fitting directly into the center region of the spirally wound element.

With respect to the replaceable unit shown in FIGS. 1 through 3, different types of adapters and housing units could be employed; for example, one set could be used wherein only the pure water permeate flows out the adapter stem through a passageway in communication with the porous straw. In such an arrangement, a suitable seal, such as a chevron-type seal, might be provided surrounding the left-hand potted end of the element for 360° in the region adjacent where the supporting ledges are shown, which seal could be created as part of a shallow end cap into which the potting resin would be injected. Such a seal would separate the annular region surrounding the element from the hollow region at the left-hand end which would then serve as a plenum or connecting passage to a feedwater inlet that would be provided by a suitable fitting on the left-hand end of the housing. A drilled hole through the potting material would be used to provide communication between the left-hand plenum and the center region of the spirally wound element. In such construction, the feedwater might flow spirally outward, and the concentrate or brine reaching the annular region surrounding the element would leave the device via a brine exit which would be similarly positioned to the inlet passageway 67 shown in the FIG. 1 embodiment.

Particular features of the invention are emphasized in the claims that follow.

What is claimed is:

1. A fluid separation device including a spirally wound semipermeable membrane element, which device comprises a spirally wound arrangement designed to enable application of polymeric material to both axial ends thereof following spiral winding thereof, including at least two elongated panels of semipermeable membrane material that are disposed so as to sandwich therebetween a layer of permeate pathway material, a layer of feed flow pathway-providing material disposed adjacent an exterior surface of one of said elongated panels of semipermeable membrane material, said sandwich and said feed flow pathway-providing material being spirally wound into a generally cylindrical configuration, said feed flow pathway material extending from a central region to the exterior surface of said cylindrical configuration, permeate exit tube means extending from an interior region within said sandwich to a region exterior of said sandwich, the spirally inner end and the spirally outer end of said elongated sandwich being closed to fluid flow, polymeric material having been applied to both axial ends of said spirally wound arrangement after spiral-winding is completed so as to solidify and create a sealed semipermeable membrane envelope about said permeate-pathway material within said sandwich, as a result of which entry into said envelope is only through said semipermeable membrane material and exit therefrom is only through said permeate exit tube means, means providing communication through said solidified polymeric material at one axial end into said central region of said spirally wound arrangement, and an exterior housing surrounding said end-sealed spirally wound arrangement, which housing has first, second and third passageways communicating between the interior and the exterior thereof, said first and second passageways, respectively, being in fluid communication with the spirally outer end of said feed flow pathway material and with said communication-providing means, and said third passageway being in fluid communication with said permeate exit tube means.

2. A separation device according to claim 1 wherein said exterior housing has a generally tubular section and includes two axial end closure means and wherein said end-sealed spirally wound arrangement is integrally interconnected with said exterior housing through said solidified polymeric material.

3. A separation device according to claim 2 wherein said second passageway means extends through one of said axial end closure means.

4. A separation device according to claim 3 wherein said first passageway means extends through the sidewall of said tubular section of said housing.

5. A separation device according to claim 4 wherein said third passageway means extends through the other of said two axial end closure means.

6. A separation device according to claim 5 wherein said communication-providing means includes a hole extending through said solid polymeric material at one axial end of said spirally wound, end-sealed arrangement, which hole is located generally along the axis of said spirally wound arrangement.

7. A separation device according to claim 3 wherein said permeate exit tube extends in a generally axial direction through said solid polymeric material at one axial end and across a major portion of the interior width of said spirally wound envelope, said tube section within said envelope being porous to fluid flow.

8. A separation device according to claim 1 wherein said end-sealed spirally wound arrangement is a part of a cartridge that is separable from and removably disposed within said exterior housing.

9. A separation device according to claim 8 wherein said cartridge includes connector means at one end of said end-sealed spirally wound arrangement, and wherein said exterior housing includes end closure means which is detachably joined to a generally tubular body portion, said end closure means and said connector means having interengaging means by which they are separably interconnected with each other.

10. A separation device according to claim 9 wherein said first, second and third passageway means are all located in said end closure means.

11. A separation device according to claim 10 wherein said second and third passageway means in said end closure means are in fluid communication with fourth and fifth passageway means formed in said connector means.

12. A separation device according to claim 11 wherein said first passageway means in said removable end closure means leads to an annular region between an interior wall surface of said generally tubular body portion and the outer surface of said cartridge.

13. A separation device according to claim 11 wherein said end-sealed spirally wound arrangement is secured to said connector means by said solid polymeric material at one axial end thereof.

14. A separation device according to claim 13 wherein said permeate exit tube means extends into said fifth passageway means in said connector means.

15. A separation device according to claim 9 wherein said generally tubular body portion has one open and one closed end, said open end having thread means formed therealong, and wherein mating thread means is formed along a corresponding region on said end closure means to permit detachable joinder of one to the other in fluid-tight arrangement.

16. A separation device according to claim 15 wherein male threads are formed on an exterior surface of said open end of said generally tubular body portion and female threads are formed on a portion of said end closure.

17. A separation device according to claim 16 wherein seat means extending from an interior wall surface of said generally tubular body portion is provided, which seat means is positioned to abut against the axial end of said cartridge opposite from said end attached to said connector means and to assure that said connector means and said end closure means remain interconnected whenever said body portion is joined in fluid-tight arrangement with said end closure means.

18. A method of making a spirally wound semipermeable membrane element suitable for use in a separation device, which method comprises
  disposing two elongated panels or semipermeable membrane material so as to sandwich therebetween a layer of permeate pathway material, a leading longitudinal end of said sandwich being closed to fluid flow,
  disposing an elongated sheet of feed flow pathway-providing material adjacent an exterior surface of one of said elongated panels of semipermeable membrane material in said sandwich,
  spirally winding said sandwich and said feed flow pathway-providing material, starting at said leading end, into a generally cylindrical configuration, so that said feed flow pathway material extends to the exterior surface of said cylindrical configuration, so as to create a spirally wound arrangement,
  sealing the trailing end of said sandwich to fluid flow,
  inserting permeate exit tube means into said sandwich so as to extend from an interior region within said sandwich to a region exterior of said sandwich,
  sealing both axial ends of said spirally wound arrangement after said spiral winding, with flowable polymeric material which solidifies so as to complete a sealed semipermeable membrane envelope about said permeate-pathway material within said sandwich, wherein entry into said sealed envelope is through said semipermeable membrane material and exit therefrom is through said permeate exit tube means, whereby a spiral feed flow pathway is also created with the entrance thereto and the exit therefrom at the longitudinal ends of said feed flow-pathway-providing material, and
  providing a channel through said solidified polymeric material into a central region of said spirally wound arrangement to establish communication with the spirally inner end of said spiral feed flow pathway,
  such that an end-sealed spirally wound arrangement is created which as a result of its location within a surrounding exterior housing having three passageways communicating between the interior and the exterior thereof provides a fluid separation device, with two of said passageways being located so as to communicate, respectively, with the spirally outer end of said feed flow pathway and with said channel, and with said third passageway being located so as to communicate with said permeate exit tube means.

19. A method according to claim 18 wherein said spiral winding is performed about a mandrel and wherein said mandrel is removed after said winding and before said sealing of said axial ends, whereby a central open space is created within said spirally wound arrangement by the removal of said mandrel which constitutes said central region communicating with said feed-flow pathway.

* * * * *